United States Patent [19]

Stengel

[11] Patent Number: 4,771,573
[45] Date of Patent: Sep. 20, 1988

[54] RAINCOAT FOR HANGING PLANTS

[76] Inventor: Arabel J. Stengel, 9034 Sky Crest Dr., Crestwood, Mo. 63126

[21] Appl. No.: 908,402

[22] Filed: Nov. 26, 1986

[51] Int. Cl.[4] .............................................. A01G 9/02
[52] U.S. Cl. .......................................... 47/67; 47/72; 47/81
[58] Field of Search .................. 47/72, 79, 81, 67, 59; 383/13, 16, 21, 22, 24, 75, 72, 74, 41; 150/52 R; 206/423; 229/87 P

[56] References Cited

U.S. PATENT DOCUMENTS

| | | | |
|---|---|---|---|
| 197,765 | 12/1877 | Conway | 47/81 |
| 540,681 | 6/1895 | Myers | 47/67 |
| 716,668 | 12/1902 | Cheney . | |
| 790,837 | 5/1905 | Hepner | 383/41 X |
| 800,371 | 9/1905 | Harter | 383/41 |
| 1,354,220 | 9/1920 | Sharrard | 383/41 |
| 1,959,782 | 5/1934 | Fenwick | 383/41 |
| 2,209,778 | 7/1940 | Krasowski . | |
| 2,289,032 | 7/1942 | Moffitt | 383/22 |
| 2,504,124 | 4/1950 | Hicks | 383/41 |
| 2,810,235 | 10/1957 | Magid . | |
| 2,956,370 | 10/1960 | Wieboldt | 47/67 |
| 3,052,063 | 9/1962 | Dunn | 47/81 |
| 3,534,498 | 10/1970 | Herrli | 47/81 |
| 3,568,965 | 3/1971 | Clark | 383/22 |
| 3,818,633 | 6/1974 | Sable . | |
| 3,865,165 | 2/1975 | Glass | 383/24 |
| 3,961,655 | 6/1976 | Nattrass | 383/24 |
| 4,149,339 | 4/1979 | Hall et al. . | |
| 4,215,514 | 8/1980 | Horowitz | 47/67 |
| 4,229,904 | 10/1980 | Burton . | |
| 4,244,147 | 1/1981 | Geddes | 47/81 |
| 4,254,771 | 3/1981 | Vidal | 383/21 |
| 4,335,770 | 6/1982 | Kulle | 383/22 |

FOREIGN PATENT DOCUMENTS

| | | | |
|---|---|---|---|
| 1806518 | 5/1970 | Fed. Rep. of Germany | 47/79 |
| 133822 | 12/1951 | Sweden | 47/81 |
| 352482 | 7/1981 | United Kingdom | 47/79 |
| 2078072 | 1/1982 | United Kingdom | 47/67 |

OTHER PUBLICATIONS

Horticulture Advertisement "Kangaroo Pouch Planter", Horticulture, p. 29, Sep. 1976.

Primary Examiner—Robert A. Hafer
Assistant Examiner—Danton D. DeMille
Attorney, Agent, or Firm—W. C. Tupman

[57] ABSTRACT

A cover for a flower pot, especially a hanging pot, which is capable of covering the sides and bottom of the pot. When watering the plant, any surplus water is collected within the cover, which is then drained through a tube projecting from the bottom thereof. The cover may be provided with a water absorbent liner, as well as a wick which is positioned to extend from the bottom of the cover into the soil within the pot. The cover may come in different decorator colors and may also be used on a flower pot which is positioned on a table. A plurality of covers and liners along with material for wicks and needle-like pulling tools may be packaged in the form of an individual kit.

11 Claims, 4 Drawing Sheets

RAINCOAT FOR HANGING PLANTS

BACKGROUND OF THE INVENTION

This invention relates to a cover or a raincoat for a flower pot and especially a hanging pot. The cover is most useful when watering the plant.

It has heretofore been known to provide a cover for a hanging plant having means to permit water collected within the cover to be dispensed therefrom. An example of this combination is found in U.S. Pat. No. 3,818,633 which comprises a circular piece of waterproof material having a plurality of eyelets located about its periphery. Three sets of hooks are positioned at spaced locations about the periphery and are used for holding gathered portions of the circular piece, as well as for attaching the cover to a hanging plant. When it is desired to dispense any water from the cover, the hooks at one location are released, thus permitting the gathered portion to open-up and allow the water therein to pour out.

Also known in the prior art is the use of a wick to supply moisture to a plant from a reservoir located either in a holder for a plant or in a cover therefore. Examples of this relationship are found in U.S. Pats. Nos. 4,149,339 and 2,810,235.

Hanging plants have become very popular for a variety of reasons. Not only are they attractive, but the plant freshens the air by absorbing carbon dioxide and by releasing oxygen into the room, thus making the room more pleasant and healthful.

However, a perennial problem with room plants exists when watering them. For most plants, proper watering comprises a good drenching that drives the stale air out of the soil and draws fresh air into the pot from the top. Attempting to do this while the pot is hanging frequently causes the pot to overflow and drip on any underlying rug or furniture. Thus, proper watering may require removing the plant to the sink, leaving it there to drain after being watered, and then replacing the plant, all of which is time consuming.

An object of the present invention is to provide a waterproof covering for a flower pot which is strong enough to collect and hold any surplus water until it is desired to remove this water through a depending drain tube. Therefore, the proper watering of a hanging plant can easily be accomplished without having to remove the plant.

Another object is to provide a cover in pleasing and decorative colors, whereby the appearance of any unsightly pot will be improved. Also, a choice of different colors permits one to match the covering to the room decor.

Still another object is to provide a cover in a plurality of different sizes, so as to more readily accommodate differently sized pots.

A further object is to provide a cover which is sufficiently strong, so that it may directly hold a plant and plant material without using a pot.

DETAILED DESCRIPTION OF THE DRAWING

Figure 1:
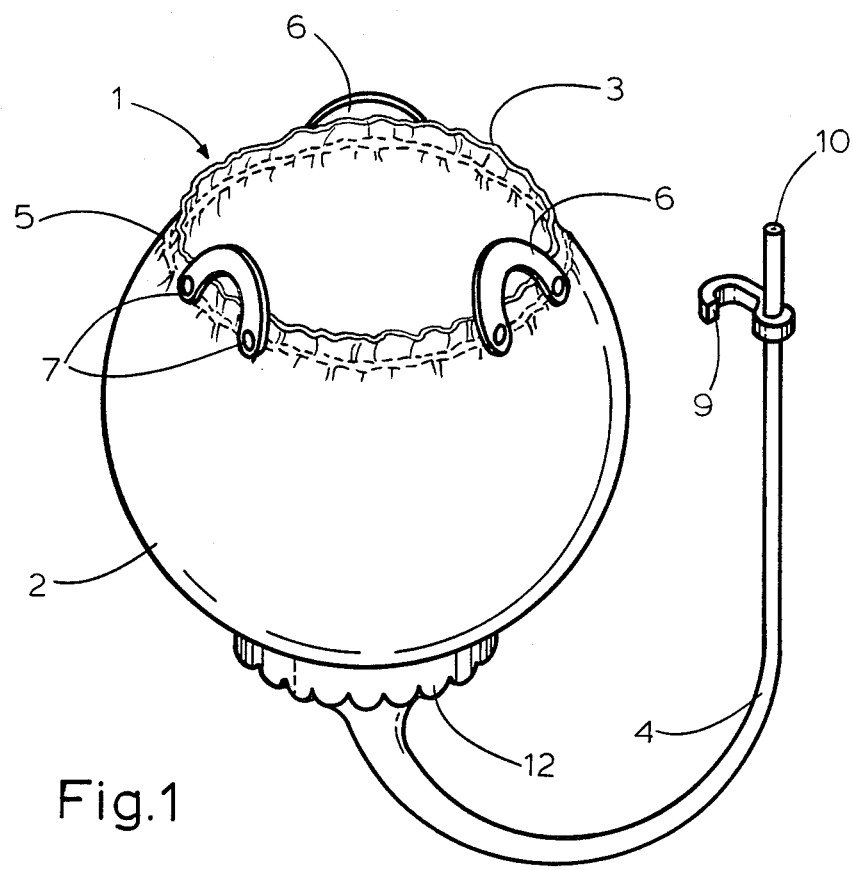
FIG. 1 is a perspective view of a hanging pot cover of the present invention.

Refering now to the views of the drawing and particularly to FIG. 1, it will be observed that the cover or raincoat 1 comprises a bowl-like body member 2 having an open top portion 3 and an elongated, flexible drain tube 4 projecting from the bottom thereof. The body member 2 is preferably made of plastic material, such as Mylar, but may comprise any waterproof material and may come in any one of a plurality of different decorator colors. The body member 2 may also be provided with an attractive design on its outer surface.

An elastic band 5 is positioned about the periphery of the upper portion 3 of the body member 2. This will permit the body member 2 to be positioned around the bottom of a pot for a hanging plant and then pulled up the sides of the pot to a position where the elastic band 5 is located over the upper rim of the pot. Thus, the body 2 is positioned to surround the entire outer side surface and bottom of the pot, whereby the elastic band 5 helps to secure the body member 2 thereabout. Instead of an elastic band, a draw string arrangement (not shown) may be used to constrict the upper portion 3 of the body member about a hanging pot.

Figure 2:
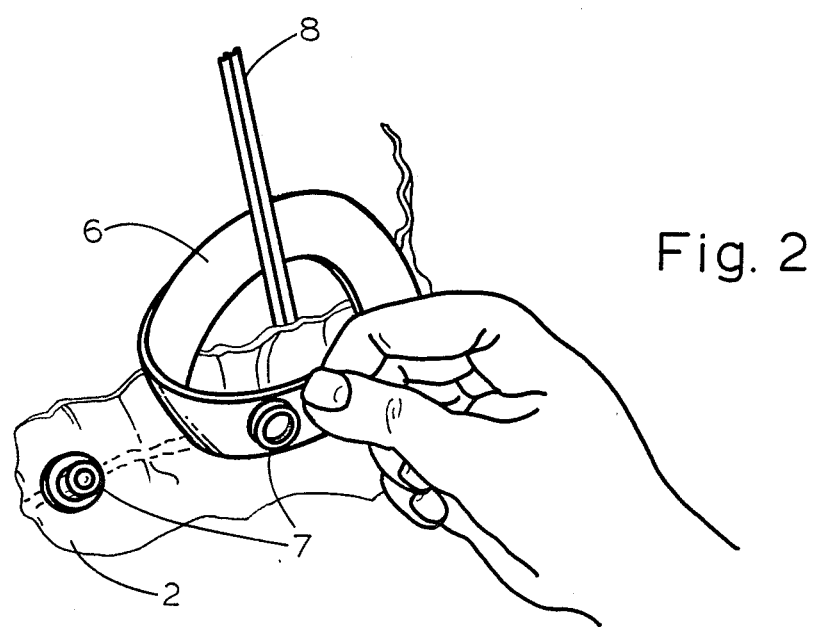
FIG. 2 is a partial view showing the detail of the strap for securing the cover to a line of a hanging pot.

A plurality of straps 6 are provided to further secure the body member 2 in its position about a hanging flower pot. These straps 6 comprise an elongated, U-shaped member which is releasably secured to the upper portion of the body member 2 by means of a snap fastener arrangement 7 located at each of its ends and on the upper portion of the body member 2. As shown in FIG. 2, these straps 6 are intended to be located around a line 8 of the hanging pot and snapped in place on the body member 2 by means of the fasteners 7. By utilizing both an elastic band 5 and a strap 6 positioned around each line 8 of the pot, the body member 2 is securely attached to the pot and would be capable of holding a large quantity of surplus water which has been applied to the plant within the pot.

Figure 3:
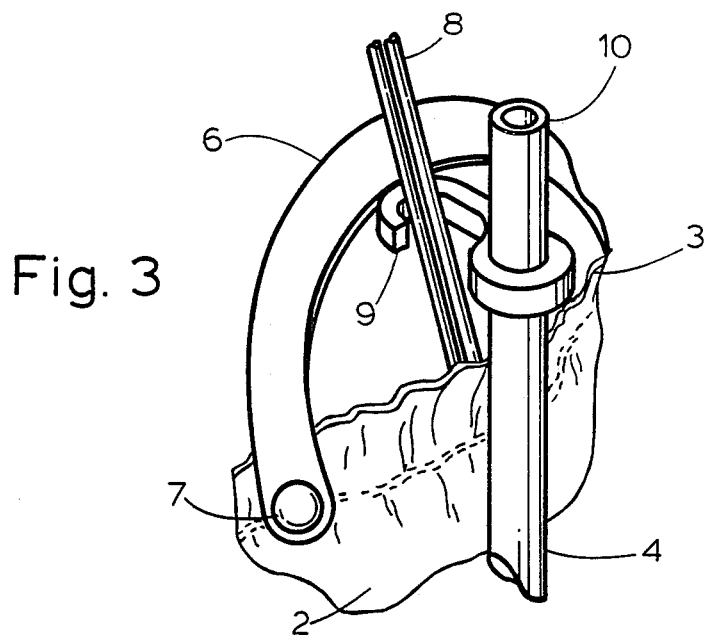
FIG. 3 is another partial view showing the hook of the drain tube in its fastened position around a line of a hanging pot.

The elongated drain tube 4 is provided with a hook 9 adjacent its end. As shown in FIG. 3, the hook 9 is positioned around a line 8 of the pot, thus securing the tube 4 with its end 10 in a location above the top portion 3 of the body member 2. Therefore, any surplus water held within the body member 2 will not be discharged from the tube 4 until the tube is unfastened from the hooked position of FIG. 3 and lowered into a suitable container (not shown) to permit the surplus water within the body member 2 to be drained into the container through the end 10 of the tube 4.

Figure 4:
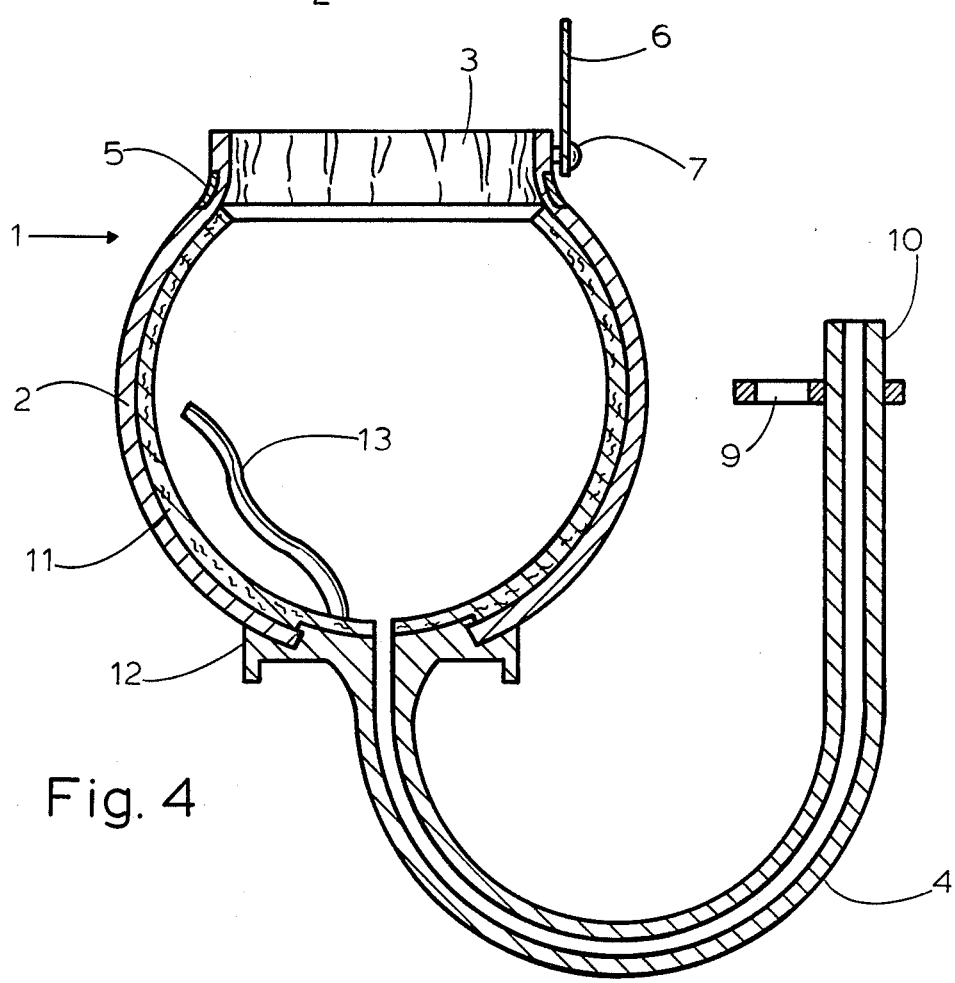
FIG. 4 is a cross-sectional view of my device taken approximately along the vertical line of FIG. 1.

As shown in FIG. 4, a moisture absorbent liner 11 may be positioned within the body member 2. This will provide a moisture supply for the plant which may be gradually absorbed through an opening in the bottom of the pot. The cover 1 may, of course, be used without a liner 11, if so desired.

Although the cover 1 of the present invention is specifically adapted to be used with a hanging plant, it should be apparent that the device may also be used with a flower pot located on a table, or the like. In this instance, the flanged skirt 12 on the bottom of the body member 2 should be made sufficiently strong to support a pot and should also be provided with a side opening (not shown) to allow the flexible tube 4 to project therethrough without any interference to the support of the flower pot. The cover should also be sufficiently strong to directly hold a plant and plant material without the use of a pot. In this instance, suitable lines 8 will be connected to the cover 2, such as at the straps 6.

In using the device, it will be evident that one need not be overly careful in controlling the amount of water which is applied to a plant, since any surplus water can easily be drained after watering. Any amount of water desired to be left within the cover 1 can also be readily determined and easily controlled during the draining operation.

Figure 5:
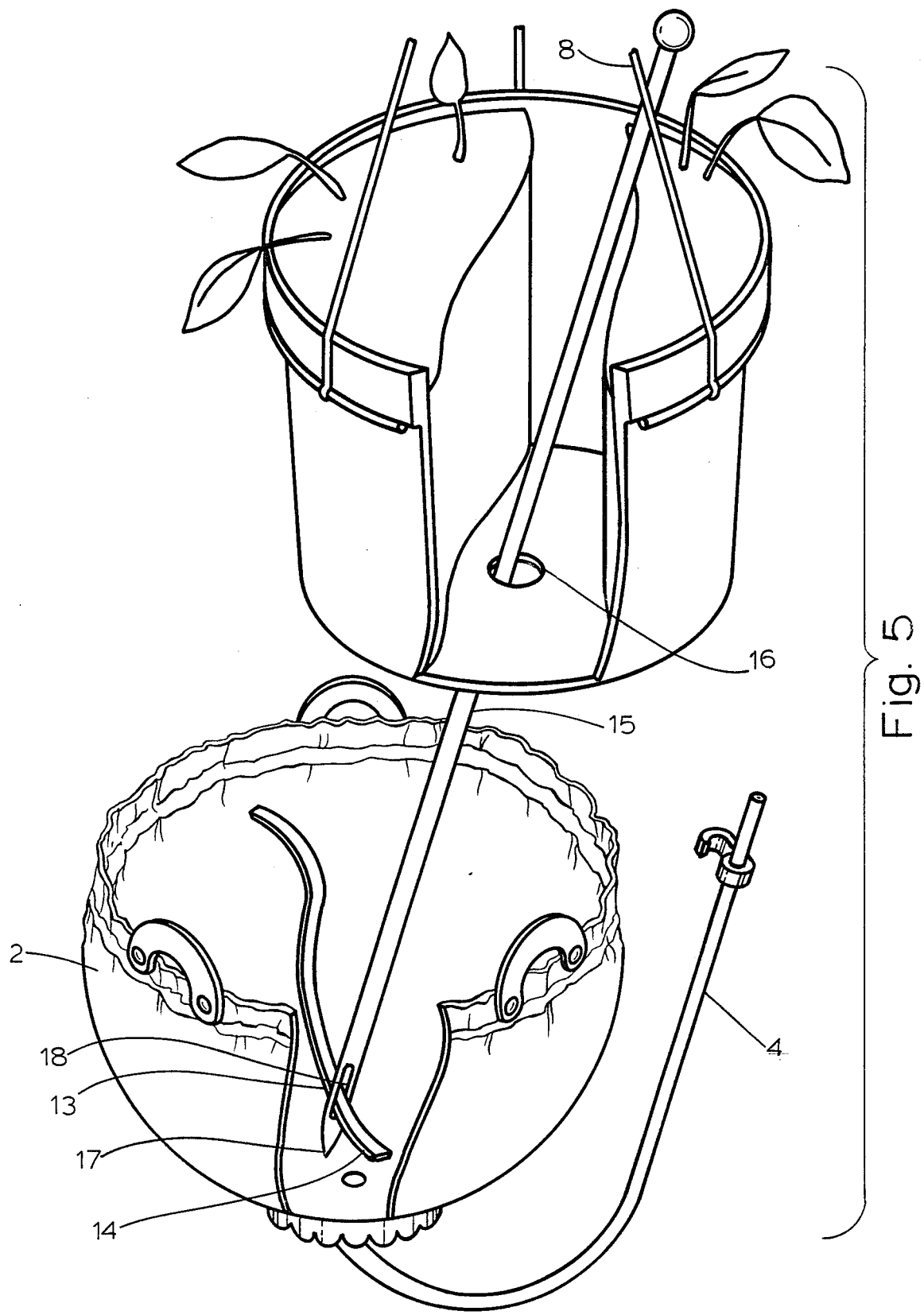
FIG. 5 is a fragmented perspective view of a cover and a flower pot showing the use of a tool for pulling a wick into the bottom of the pot.

As best shown in FIG. 5, the cover is provided with a wick 13 which is made of moisture absorbent material. The wick 13 may be secured at one end 14 to the inner bottom surface of the body member 2. However, the wick 13 may merely be positioned within the bottom area of the body member or, as shown in FIG. 4, the wick 13 may be secured to the inner surface of the liner 11. Also, but not shown in the drawing, a wick and a liner may be used together wherein the wick is secured to the inner surface of the body member 2, as in FIG. 5, and then projected through an opening in the liner 11 to an interior position within the cover 1.

With the cover in the position shown in FIG. 5, a needle-like pulling tool 15 is forced through the soil or plant supporting material within the pot and then through the drain hole 16 in the bottom thereof, so that the pointed end 17 of the tool 15 projects below the bottom surface of the pot. The wick 13 is then threaded through the eye 18 in the pulling tool 15, whereby as the pulling tool is removed through the pot, the wick 13 will be pulled into the pot through the drain hole 16 and will thus permit moisture in the bottom area of the cover to be supplied to the plant in the pot by way of capillary action. When pulling a wick which is not attached to either the cover or a liner, one would need to hold an end of the wick during the pulling operation and to make sure that the held end projects through the bottom of the pot after pulling.

Figure 6:
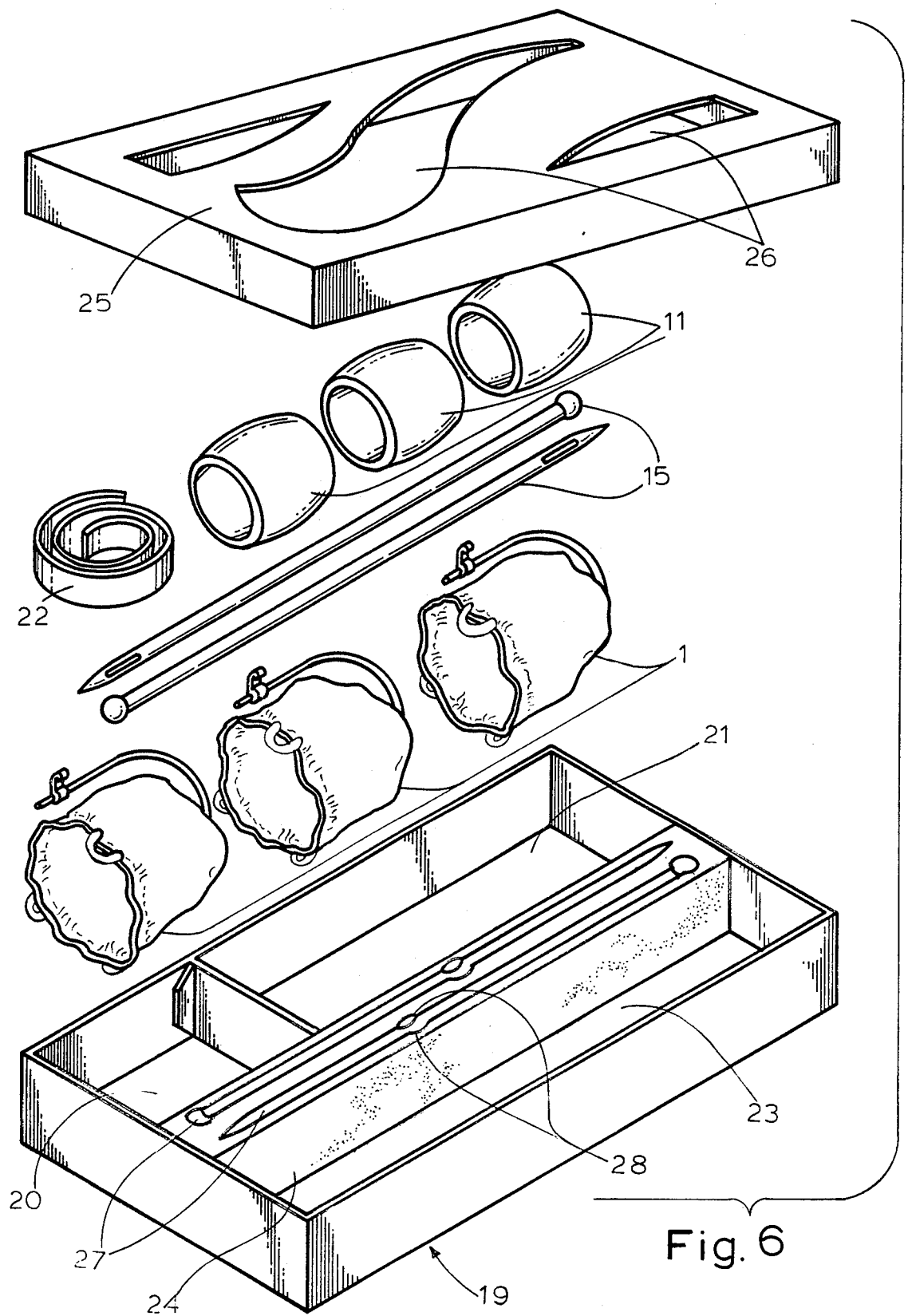
FIG. 6 is an exploded view of a package containing a roll of wick material and a plurality of liners, pulling tools and covers.

A package for a plant watering kit is shown in FIG. 6. This package comprises a compartmented receptacle 19 which has a small compartment 20 and a larger compartment 31 positioned along one side. A roll 22 of wick material is carried in the smaller compartment 20 and may be cut to a desired length when used with a plant cover. A plurality of liners 11 are intended to be carried in the compartment 21 and a plurality of plant covers 1 are to be positioned in the compartment 23. An elongated member 24 is positioned between the compartments and is provided with a pair of sculptured or molded recesses 27 in its upper surface. Each recess 27 is the same shape as that of an elongated pulling tool 15 and will therefore provide a snug storage area for each pulling tool. The elongated member 24 may be made of styrofoam, or other plastic material, and constitutes the inner wall for each compartment. A cover 25 is provided for the receptacle and may be provided with a set of windows as at 26. While the kit illustrated in FIG. 6 is provided with a single roll of wick material, three liners, two pulling tools and three covers, it is to be understood that more of these items, or even a fewer number of liners, pulling tools or covers may be packaged in an individual kit. Each recess 27 is provided with a pair of oppositely positioned depressions 28 located approximately midway its length. Thus, two opposed fingers of one's hand may readily engage opposite sides of a tool 15 when it is desired to remove that tool from the recess 27. Also, instead of the wick material being in the form of a roll, the wick material may be precut, wherein a plurality of cut wicks may be carried in compartment 20.

Since various changes may be made in the construction of this flower pot cover without departing from the scope of my invention, it is intended that all matter contained in the foregoing description and shown in the accompanying drawing shall be interpreted as illustrative only.

I claim:

1. A cover for a hanging flower pot wherein said pot is suspended from an overlying support by means of a plurality of attaching lines connected at one end to the pot and at the other end to the support, comprising a flexible, non-rigid, moisture impervious body member having continuous side portions, a bottom portion and a large opening opposite said bottom portion, selective drain means centrally located at said bottom portion, said drain means comprising an elongated, flexible tube, the diameter of said tube being a minor fraction of the diameter of said opening, with the length of said drain tube being greater than the height of said cover and said tube being provided with a hook positioned adjacent to the terminal end thereof, said hook being adapted to engage one of said attaching lines to secure said drain tube in an upright position along side an outer surface of said side portion of the cover with said terminal end projecting above said side portion of said cover, said cover being provided with plural, diverse fastening means adjacent to the large opening thereof for receiving said cover to the hanging pot, one of said fastening means comprising a plurality of elongated straps and securing means located along the periphery of said cover adjacent said opening and at each end of each of said straps for securing the two ends of each strap to the cover, said securing means on at least one end of each strap being a snap fastener, the length of each strap being a minor fraction of the length of said cover taken along the periphery of the cover adjacent the opening, whereby a strap is adapted to be positioned about one of said attaching lines with the detachable securing means on said at least one end of each strap being attached to the securing means on the cover to thus secure the cover to the outer surface of the hanging pot, whereby any surplus water when a plant within the flower pot is watered is collected within the cover and whereby said surplus collected water is adapted to be selectively drained therefrom through said tube without removing any of said fastening means.

2. The cover of claim 1, wherein the securing means at each end of said strap is detachable from said cover.

3. The cover of claim 1, wherein said plural, diverse fastening means further includes means continuously located along substantially the entire length of the periphery of the cover adjacent said opening.

4. The cover of claim 3, wherein said further fastening means comprises an elastic band.

5. The cover of claim 3, wherein said further fastening means comprises a draw string.

6. The cover of claim 1, including a removable liner positioned within said body member, said liner being made of fluid absorbent material so as to provide a continuing supply of moisture to the plant.

7. The cover of claim 6, including a wick located within said body member adjacent the bottom surface thereof, said wick being attached to the liner, so as to provide a further continuing supply of moisture to the plant.

8. The cover of claim 6, including a wick located within said body member, said wick being secured to the bottom surface of said body member and extending through an opening in said liner thereby providing a further continuing supply of moisture to the plant.

9. The cover of claim 1, including a wick located within the body member at a position adjacent the bottom surface thereof and adapted to extend into the soil, so as to provide a continuing supply of moisture to the plant.

10. The cover of claim 9, wherein one end of the wick is secured to the inner surface of the bottom of the cover.

11. The cover of claim 1, wherein said elongated strap is U-shaped.

* * * * *